March 12, 1963

G. B. SPEEN 3,080,761

ACCELEROMETER

Filed March 24, 1959

INVENTOR.
GERALD B. SPEEN

BY

ATTORNEY

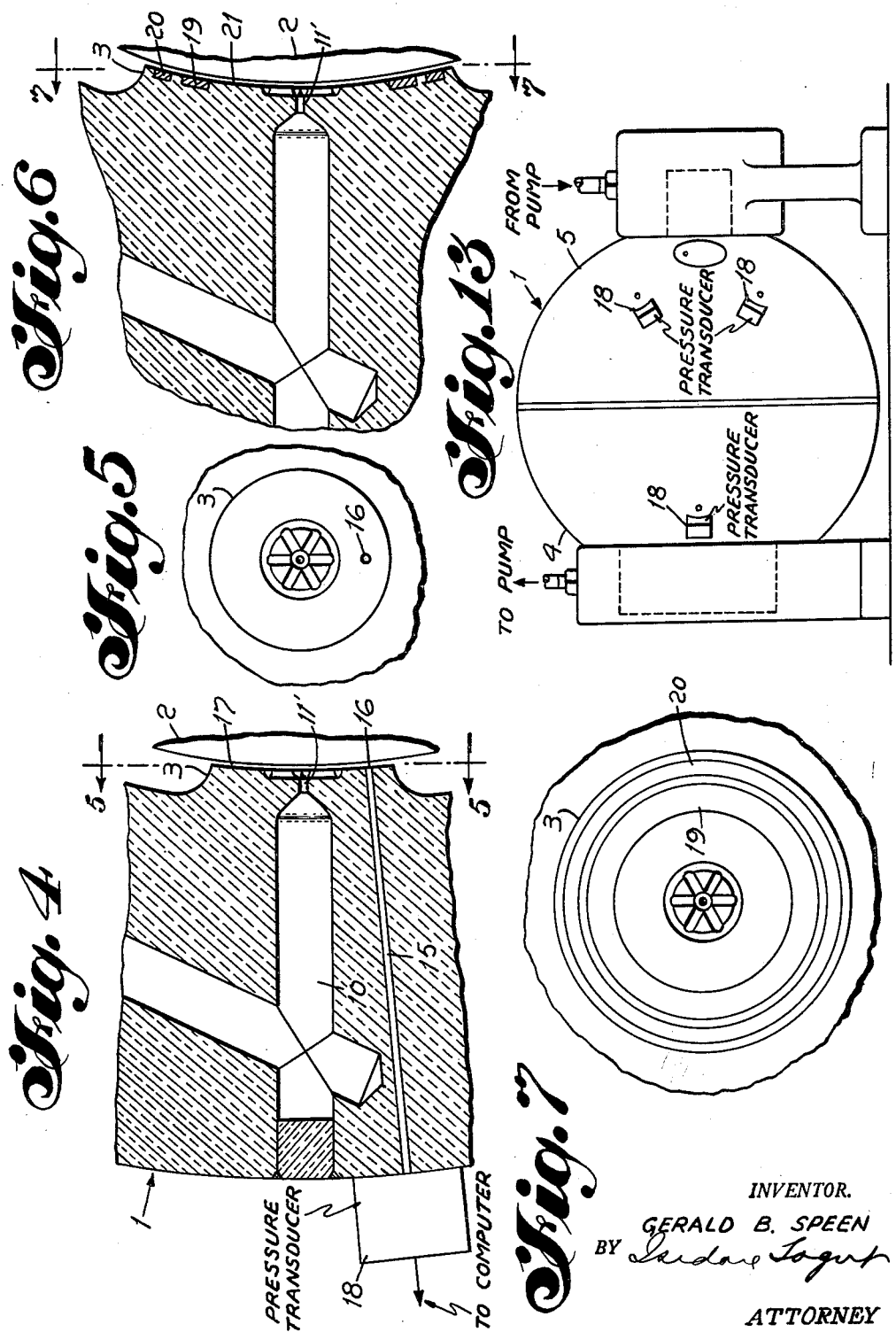

March 12, 1963

G. B. SPEEN 3,080,761

ACCELEROMETER

Filed March 24, 1959

INVENTOR.
GERALD B. SPEEN
BY *[signature]*
ATTORNEY 3,080,761
ACCELEROMETER
Gerald Bruce Speen, Sepulveda, Calif., assignor to International Telephone and Telegraph Corporation, Nutley, N.J., a corporation of Maryland
Filed Mar. 24, 1959, Ser. No. 801,662
13 Claims. (Cl. 73—516)

This invention referes to accelerometers and more particularly to an accelerometer providing output information in analog form.

In the operation of high speed aircraft, guided missiles or pilotless aircraft and the like, it is desirable to provide means which indicate the acceleration forces acting on the craft in order to properly control the flight of the aircraft to the desired objective. Such means must provide reliable and accurate information. Accelerometers previously used have proven unsatisfactory because of hysteresis and various other effects encountered therein which cause inaccuracy of readings.

It is one object of this invention to provide an accelerometer which has low restoring force losses.

It is a further object to provide an accelerometer wherein the inertia member has no direct contact with the housing thus reducing frictional effects which might otherwise cause large errors in an accelerometer of this type.

Another object is to provide a new and novel accelerometer which is simple and rugged in operation with only one moving part, yet reliable and accurate in operation.

A feature of this invention is an accelerometer for use with a moving vehicle which comprises a housing, an inertia body, and a plurality of bearings supporting the body in spaced relation for relative movement with respect to the housing when the rate of movement of the vehicle changes. Means are provided for sensing any change in the spaced relation caused by any change in the rate of movement of the vehicle and responsive to the change in the spaced relation to produce an output signal indicative of the magnitude and direction of the relative movement.

A further feature is that the bearings comprise gas bearings and the body has bearing means disposed in coactive association with the bearings. Spaced gaps separate the body from the bearings and a pressure transducer senses changes in the gas pressure in the gaps caused by the relative movement of the body when acceleration forces act on the vehicle.

Another feature of this invention is that in another embodiment the sensing means comprise electrostatic capacitor elements disposed on the adjacent surfaces of the gas bearings and the body and means are provided to determine the change in capacity between the adjacent capacitor elements which occur when the body moves relative to the housing and thus changes the spacing between the capacitor plates.

Still another feature is that in the electrostatic sensing means, the capacitor elements comprise at least two concentric rings on the bearing surface and the surface of the body comprises conductive material. The sensing means may also be varied by disposing only one conductive annulus on the bearing surface and separating this annulus into two semicircular segments to provide two distinct capacitors in conjunction with the conductive surface of the body.

Still another feature is that the inertia member may be in the form of a sphere with the bearing means disposed along three orthogonal axes in spaced relation for relative movement with respect to the housing when the rate of movement of the vehicle changes. Means are provided for sensing any change in each of the spaces between the sphere and the gas bearings.

Another feature is that the inertia member may be in the form of a cube with the bearing means disposed in opposed pairs along three orthogonal axes in spaced relation for relative movement with respect to the housing when the rate of movement of the vehicle changes, the axes of each pair coinciding with the corresponding center lines of opposed surfaces of the cube. Means are provided for sensing any change in each of the spaces between the surfaces of the cube and the adjacent surfaces of the bearing means to provide acceleration information resolved into three axial components.

Still another feature is that the inertia member may be in the form of a cylinder, with the curved surface of the cylinder supported by journal gas bearings with gas bearings provided adjacent the end surfaces of the cylinder. Means are provided for sensing any change in the spaces between the end surfaces of the cylinder and the adjacent gas bearings to provide information regarding relative movement of the cylinder with respect to the housing along the axis of the cylinder; that is, this is a single axis accelerometer as distinct from the sphere and cube embodiments which provide acceleration information along three coordinate axes.

The above-mentioned and other features and objects of this invention will become more apparent by reference to the following description taken in conjunction with the accompanying drawings, in which:

FIG. 4 is an enlarged view of one of the gas bearing pads shown in cross-section in FIG. 2;

FIG. 5 is a plan view of the gas bearing pad of FIG. 4;

FIG. 6 is an expanded cross-sectional view of the gas bearing pad with capacitor segments located on the bearing surface thereof;

FIG. 7 is a plan view of the gas bearing pad with capacitor elements of FIG. 6;

FIG. 13 is an assembled view of the accelerometer of FIGS. 1, 2 and 3 with end supports therefor.

In the copending application of P. R. Adams-G. B. Speen-C. C. Miller, Jr., Serial No. 663,290, filed June 3, 1957, now Patent No. 2,940,318, issued June 14, 1960, a new type of gyroscope is disclosed that makes use of gas bearings to take advantage of the very low static friction characteristic of such gas bearings. A pressure, lower than that used in the bearings, is maintained around those parts. In the copending application of P. R. Adams-G. B. Speen-D. E. Brannon, Serial No. 798,556, filed March 10, 1959 improvements in this new type of gyroscope are disclosed including caging plugs for supporting the movable inner member of the gyroscope when gas is not applied to the gas bearings. Similar types of gas bearings and caging plugs are utilized in this invention for supporting the inertia member for relative linear movement with respect to the housing and in the event that no gas is applied to these bearings, caging plugs similar to that described in the second mentioned copending application are provided for statically supporting the inertia member.

Figure 1:
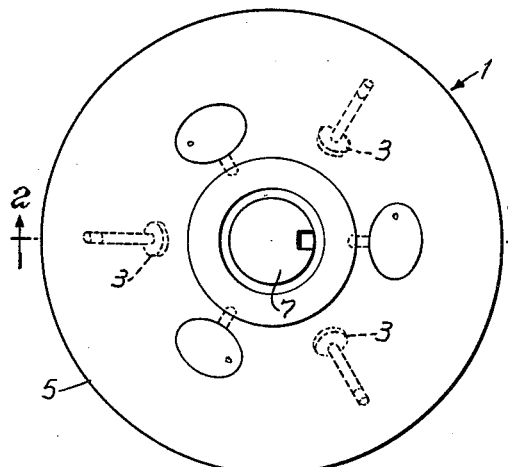
FIG. 1 is an end view of the accelerometer of this invention.
Figure 2:
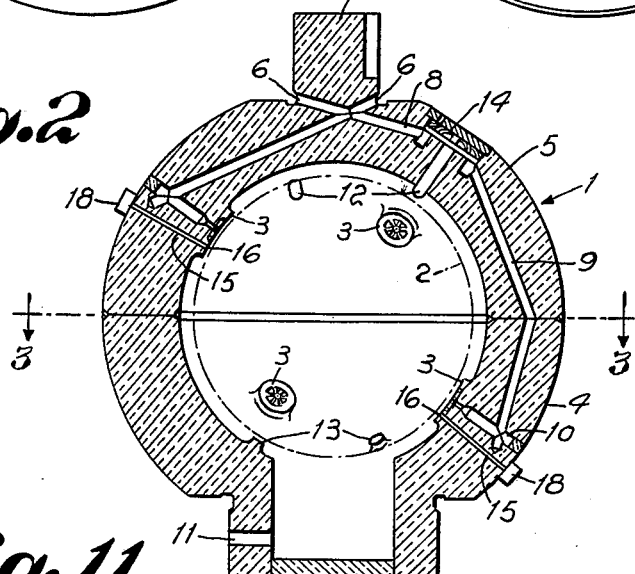
FIG. 2 is a cross-sectional view along the line 2—2 of FIG. 1.

Referring now to FIGS. 1, 2, 3 and 4, there is disclosed a housing 1 inside of which is disposed an inertia member or spherical body 2, the surface of which substantially conforms to the inner spherical surface of the housing 1. Six bearing pads 3 protruding from the inner surface of the housing 1 support the spherical body 2. These bearing pads 3 are disposed along three orthogonal axes. Three of them are integral with one half 4 of the housing 1 and the other three are integral with the other half 5 of the housing. Gas under high pressure is admitted to the housing 1 through some sort of opening such as the ports 6 in the supporting end portion 7 where it is conducted through manifold port passages 8 and 9 to an interior chamber 10 within the gas bearings 3. The gas which exits through the bearing pads 3 into the interior of the housing 1 is fed to the bearing surfaces through the metering hole 11'. The gas is then returned to the pump through the exhaust port 11. To properly support the inertia member 2 during such times as the accelerometer is not operating, three movable caging plugs 12 are provided within the upper half 5 of the housing 1. Three fixed caging plugs 13 are disposed in the lower half 4 of the housing 1. The fixed caging plugs are disposed axially opposite to the movable caging plugs 12. Gas under pressure is supplied to the movable caging plugs 12 to force them outwardly against the pressure of the spring 14 and thus eliminate the contact between both the fixed and movable caging plugs against the surface of the spherical body 2 during the time that the accelerometer is in operation. A sampling hole 15 connects the gap 16 between the surface of the spherical body 2 and the bearing surface 17 of the bearing pad 3 to a pressure transducer 18 disposed on the outside surface of the housing 1. In this embodiment, six bearing pads, three pairs arranged mutually orthogonal and opposing each other is the preferred embodiment for determining acceleration forces along three coordinate axes. However, several arrangements of individual pads may be used with an increase in computing difficulty. Naturally, the number of pads and their arrangement must be such that the suspended element is acted upon equally along all the coordinate axes. Four, six, eight, twelve or twenty pads accomplish this for a sphere. The sensing means disclosed in FIGS. 2, 4 and 5 is a pressure monitoring system. The pressure is measured within the space 16 through the sampling hole 15 and any well known pressure transducer 18 will produce an electrical signal analogous to the pressure existing in the space 16. The output signals of the pressure transducer 18 can be used in any computer (not shown) that can multiply and divide and compute square roots to obtain acceleration. There are many computers available today which will provide these functions. It is preferable to use a differential pressure transducer so that only one will be required for each axis to sample pressures on both sides. However, as shown in the illustration, a transducer can be used at each end of the axis to obtain the same information. Another variation is to use only one pressure transducer sampling only one bearing of a pair and use that information only, as obviously a decrease in pressure at one end means a corresponding increase in pressure on the other side.

Figure 8:
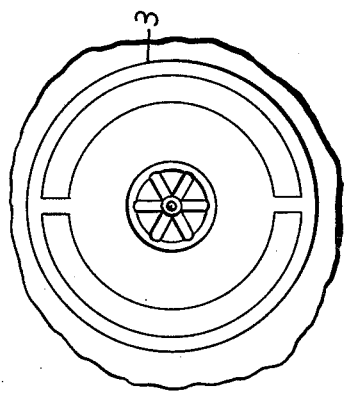
FIG. 8 is a plan view of the gas bearing pad similar to that of FIG. 6 and showing two semicircular capacitor segments formed from one annulus disposed on the bearing surface of the gas pad.

FIGS. 6, 7 and 8 illustrate an electrostatic capacitive pickoff which can be applied as the sensing means for this accelerometer. The gas bearing 3 is provided with two capacitor plates such as two concentric rings 19 and 20 disposed on the bearing surface. The housing 1 may be made of nonconductive material, such as glass or quartz, and the capacitor rings 19 and 20 may be made of a conductive material which may be painted onto the surface 21 or the surface 21 may be machined to receive the conductive material of the capacitor rings 19 and 20 so that they are flush with the surface 21. The spherical body 2 may be a glass or quartz sphere coated with a thin aluminum film or a metallic sphere preferably made of aluminum either hollow or solid. Two pairs of capacitor plates 19 and 20 are necessary for each axis of sensitivity. Therefore, for the three axis embodiment, such as the sphere, twelve plates are used, each gas bearing having two capacitor plates as shown in FIGS. 6 and 7. In multi-axis operation, the three axes of pickoffs are identical so only a one axis system will be described since this can obviously be extended to the three axes.

Figure 11:
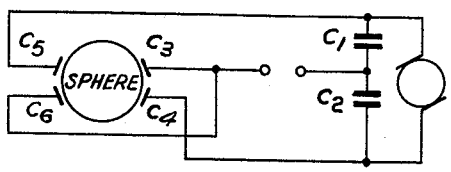
FIG. 11 shows the electrostatic pickoff sensing means of this invention.
Figure 12:
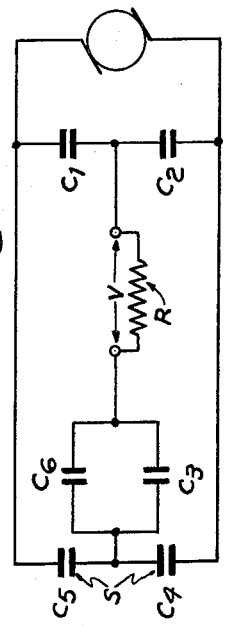
FIG. 12 is the equivalent electrical diagram for the electrostatic pickoff system of FIG. 11.

In FIGS. 11 and 12, there is shown a capacitive pickoff system utilizing the sphere and an equivalent electrical circuit therefor for a one axis system. C5 and C6 may be considered equivalent to the conductive rings 19 and 20 on one gas bearing. C3 and C4 are the conductive rings on the gas bearing disposed axially opposite to the gas bearing containing the capacitor plates C5 and C6. It should be noted that by the addition of the two additional rings forming capacitors C3 and C6, it is possible to sense a change in the position of the spherical body 2 without any connections or leads on the sphere. The equivalent circuit of FIG. 12 is an A.C. bridge which becomes unbalanced when the spherical body moves closer to one side or the other and a signal voltage V is produced across the resistor R. C1 and C2 are the fixed impedance arms of the bridge. The voltage output is not linear with respect to the spacing between the plates of conductive rings and the spherical body 2 but is quite predictable. Therefore, the change in the spacing can be detected and consequently the acceleration acting on the vehicle. The capacitor plates in the capacitors C3, C4, C5 and C6 marked S are all really the metallic surface of the spherical body 2. The location of the capacitor plates 19 and 20 can be as in FIGS. 6 and 7 or FIG. 8, though it is to be understood that there are other ways of providing for conductive capacitor plates. The electrodes, i.e., the capacitor plates can be placed in opposing pairs in a similar manner as a pad but rotated so that they fall between the pads on the same readout line, or these pairs could be placed, say four around the equator and one at each pole. However, in all cases, all the capacitor plates should be of equal area so that the capacitances of all the capacitors will be equal. It is possible to have the capacitor plates made of sheet metal and formed to conform with the surface which constitutes the opposing electrode and supported on insulators. When an acceleration force acts on the sensitive element or the inertia body 2, it moves in the direction of this acceleration. If we assume that this is along the axis of a bearing pad pair then the element moves toward a given pad by an amount which is related to the difference between the end thrusts of that pad and of the opposing pad. When the force due to the difference in thrust equals the force due to the mass of the suspended element multiplied by the acceleration, the element or the inertial body stops. The electrodes around the pads see a change in capacitance due to the change in distance between the electrode plates on the bearing pads and the surface of the conductive element. The acceleration is then computed from the bridge reading which results from the changes in separations that result from the end thrusts balancing the acceleration force. The acceleration computed in this way along each or all sensitive axes gives the necessary information. If the acceleration force is acting not along any of the coordinate axes, the acceleration is then automatically resolved into components along the particular axes and each component considered separately.

Figure 9:
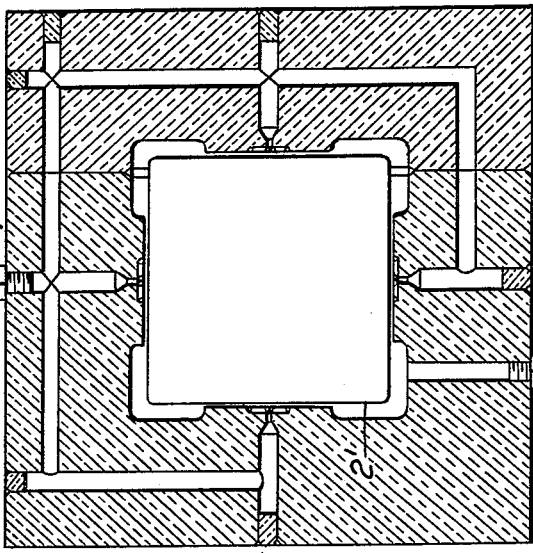
FIG. 9 is a cross-sectional view of an accelerometer wherein the inertia member is in the form of a cube.

The embodiment in FIG. 9 disclosing the cube form for the inertia body 2' operates in a manner similar to that described for the sphere embodiment since the bearing pads in this case are also arranged along three orthogonal axes which coincide with the center lines joining the centers of the opposed surfaces of the cube and therefore the acceleration can be computed along any of the axes or if the acceleration is acting not along any of the orthogonal axes, it is resolved into the forces acting along the orthogonal axes.

Figure 3:
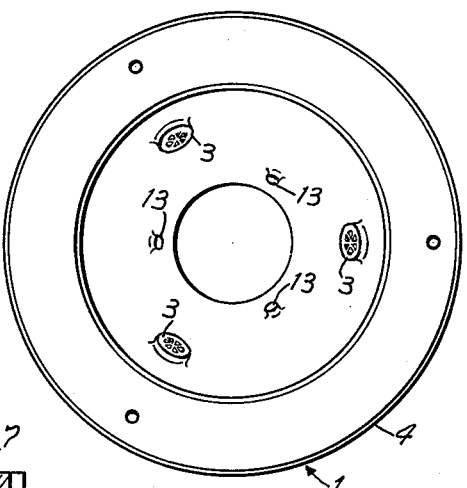
FIG. 3 is a cross-sectional view along the line 3—3 of FIG. 2.

In FIG. 9, no caging plugs have been shown but it is to be understood that the same structural elements shown in FIGS. 1, 2 and 3 can be used in the embodiment of FIG. 9. It is also to be understood that the sensing means, both pressure sensitive and capacitance sensitive means described for the spherical inertia body are also applicable to the cube form.

Figure 10:
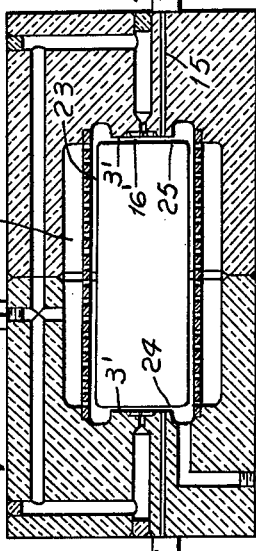
FIG. 10 is a cross-sectional view of a single axis accelerometer where the inertia member is in the form of a cylinder.

In FIG. 10, there is shown an embodiment for a one axis determination of acceleration utilizing a cylinder 23 which is supported by journal gas bearings 22 along its curved surface. A gas thrust bearing pad 3' at each flat end 24 and 25 provides a one axis spring restraint and a single axis accelerometer results thereby. The embodiment of FIG. 10 shows the hole 15 connecting the gap 16' between the surface of the gas bearing and the end surfaces 24 and 25 of the cylinder 23 with the two pressure transducers 18. It is to be understood, however, that in this case as in the other embodiments disclosed above, the capacitor sensing means may also be used instead of the pressure sensitive system.

While I have described above the principles of my invention in connection with specific apparatus, it is to be clearly understood that this description is made only by way of example and not as a limitation to the scope of my invention as set forth in the objects thereof and in the accompanying claims.

I claim:

1. An accelerometer for use with a moving vehicle comprising a housing, a body, means disposing said body within said housing including a plurality of bearing pads supporting said body in spaced relation for relative movement with respect to said housing when the rate of movement of said vehicle changes, at least two of said bearing pads protruding from the inner surface of said housing in opposed axial relation and supporting said body, said body having bearing means disposed in coactive association with said bearing pads, means to supply gas to the spaces between said body and said bearing pads, means coupled to said housing for sensing change in the spacing between the body and said bearing pads caused by a change in the rate of movement of said vehicle to produce an output signal indicative of the magnitude and direction of said relative movement.

2. An accelerometer for use with a moving vehicle, comprising a housing, a body, means disposing said body centrally within said housing, said disposing means comprising a plurality of pairs of bearing pads protruding inwardly from the inner surface of said housing toward said body and supporting said body in spaced relation for relative movement with respect to said housing when the rate of movement of said vehicle changes, said bearing pads of each of said pairs being disposed in opposed axial relation, the axes of said pairs being disposed in coincidence with the corresponding center lines of opposed faces of an imaginary polyhedron, said body having bearing means disposed in coactive association with the bearing pads of each of said pairs, means to supply gas to the spaces between said body and said bearing pads and means coupled to said housing for sensing change in said spaced relation caused by a change in said rate of movement of said vehicle to produce an output signal indicative of the magnitude and direction of said relative movement.

3. An accelerometer for use with a moving vehicle comprising a housing, a body, means disposing said body centrally within said housing, said disposing means comprising a plurality of pairs of bearing pads protruding inwardly from the inner surface of said housing toward said body and supporting said body in spaced relation for relative movement with respect to said housing when the rate of movement of said vehicle changes, said bearing pads of each of said pairs being disposed in opposed axial relation, the axes of said pairs being disposed in coincidence with the corresponding center lines of opposed faces of an imaginary polyhedron, said body having bearing means disposed in coactive association with the bearing pads of each of said pairs, and means coupled to said housing for sensing change in said spaced relation caused by a change in said rate of movement of said vehicle to produce an output signal indicative of the magnitude and direction of said relative movement, said bearing pads comprising gas bearings and said body being spaced apart from said bearing pads by gaps and said housing including means to supply gas to said bearing pads.

4. An accelerometer according to claim 3 wherein said sensing means include a pressure transducer and at least one of said bearing pads includes a feedhole connecting the input of said pressure transducer with said gap separating said body from said bearing pad whereby said pressure transducer will sense changes in the gas pressure in said gap caused by movement of said body.

5. An accelerometer according to claim 3 wherein said sensing means comprise electrostatic elements supported from said housing and disposed adjacent the surface of said body, said surface comprises conductive material and each said element and said surface form an electrostatic capacitor, and means coupled to said electrostatic elements to derive an output signal when said relative movement occurs.

6. An accelerometer according to claim 5 wherein said means coupled to said electrostatic elements include a source of alternating current and a pair of fixed impedances to comprise together with an opposed pair of said capacitors an alternating current bridge whereby an output signal is derived indicative of said relative movement in the direction of the axis connecting said pair of capacitors.

7. An accelerometer according to claim 6 wherein said electrostatic elements are supported on the bearing surfaces of said bearing pads.

8. An accelerometer according to claim 7 wherein said electrostatic elements comprise at least two concentric rings on the bearing surface of each gas bearing pad, each said ring forming with said conductive surface an electrostatic capacitor.

9. An accelerometer according to claim 7 wherein said electrostatic elements comprise two semicircular segments of an annulus disposed on the bearing surface of each gas bearing pad, each said segment forming with said conductive surface an electrostatic capacitor.

10. An accelerometer for use with a moving vehicle comprising a housing, means disposing a spherical body centrally within said housing, said disposing means comprising a plurality of pairs of gas bearing pads protruding inwardly from the inner surface of said housing toward said body and supporting said body in spaced relation for relative movement with respect to said housing when the rate of movement of said vehicle changes, each of said pairs being disposed in opposed axial relation along three orthogonal axes, said body having bearing means disposed in coactive association with the gas bearing pads of each of said pairs, gaps separating said body from said bearing pads, means associated with said housing to supply gas to said bearing pads, and means coupled to said housing for sensing any change in said gaps caused by any change in said rate of movement of said vehicle and responsive to change in said gaps to produce an output signal indicative of the magnitude and direction of said relative movement along said orthogonal axes.

11. An accelerometer for use with a moving vehicle comprising a housing, a cube-shaped body, a plurality of bearings supporting said cube in spaced relation for relative movement with respect to said housing along three orthogonal axes when the rate of movement of said vehicle changes, the axes of said pairs being in coincidence with the corresponding center lines forming the centers of opposed surfaces of said cube, said bearings comprising gas bearing pads protruding inwardly from the inner surface of said housing toward said cube and disposed adjacent each surface of said cube in coactive association with said cube, gaps separating said cube from said bearing pads, means to supply gas to said bearing pads, and means coupled to said housing for sensing any change in said gaps caused by any change in said rate of movement of said vehicle and responsive to change in said gaps to produce an output signal indicative of the magnitude and direction of said relative movement along said orthogonal axes.

12. An accelerometer for use with a moving vehicle comprising a housing, a cylindrical body, a plurality of bearings supporting said body in spaced relation for relative movement with respect to said housing along the axis of said cylinder when the rate of movement of said vehicle changes, said bearings comprising a plurality of gas bearings disposed in coactive association with the cylindrical surface of said cylinder and a gas bearing pad protruding inwardly from the inner surface of said housing toward said body and disposed adjacent each end surface of said cylinder, gaps separating said body from said bearings and means coupled to said housing for sensing any change in at least one of said gaps between said end surfaces of said cylinder and said gas bearing pads adjacent thereto caused by any change in said rate of movement of said vehicle and responsive to change in said gap to produce an output signal indicative of the magnitude and direction of said relative movement along said axis.

13. An accelerometer for use with a moving vehicle comprising a housing, a body, means disposing said body within said housing including a plurality of bearing pads supporting said body in spaced relation for relative movement with respect to said housing when the rate of movement of said vehicle changes, said bearing pads protruding from the inner surface of said housing towards said body, said body having bearing means disposed in coactive association with said bearing pads, means to supply gas to the spaces between said body and said bearing pads, the axis of each said bearing pad being disposed in coincidence with the corresponding perpendicular lines to a surface of an imaginary polyhedron which passes through the center of said polyhedron, all said axes if extended meeting at the center of said body.

References Cited in the file of this patent
UNITED STATES PATENTS

| | | |
|---|---|---|
| 2,078,616 | Smith et al. | Apr. 27, 1937 |
| 2,258,613 | Kannenstine et al. | Oct. 14, 1941 |
| 2,338,732 | Nosker | Jan. 11, 1944 |
| 2,591,921 | Cosgriff et al. | Apr. 8, 1952 |
| 2,695,165 | Hansen | Nov. 23, 1954 |
| 2,695,199 | Blizard | Nov. 23, 1954 |
| 2,710,234 | Hansen | June 7, 1955 |
| 2,832,581 | Youngs | Apr. 29, 1958 |
| 2,840,366 | Wing | June 24, 1958 |
| 2,856,240 | Breazeale et al. | Oct. 14, 1958 |
| 2,881,276 | Mintz et al. | Apr. 7, 1959 |
| 2,908,164 | Bamber | Oct. 13, 1959 |
| 2,919,583 | Parker | Jan. 5, 1960 |
| 2,940,318 | Adams | June 14, 1960 |

FOREIGN PATENTS

| | | |
|---|---|---|
| 729,894 | Germany | Dec. 19, 1942 |